United States Patent
Tsai et al.

(10) Patent No.: US 7,177,502 B2
(45) Date of Patent: Feb. 13, 2007

(54) HEATING OPTICAL DEVICES

(75) Inventors: Tsung-Ein Tsai, San Jose, CA (US); Junnarker Mahesh, San Jose, CA (US); Gabel Chong, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/151,010

(22) Filed: Jun. 13, 2005

(65) Prior Publication Data

US 2005/0232543 A1    Oct. 20, 2005

Related U.S. Application Data

(62) Division of application No. 10/351,828, filed on Jan. 27, 2003, now Pat. No. 6,961,495.

(51) Int. Cl.
    *G02B 6/34* (2006.01)
(52) U.S. Cl. ...................................................... 385/37
(58) Field of Classification Search ................ 385/37; 11/11
    See application file for complete search history.

(56) References Cited

U.S. PATENT DOCUMENTS

| | | | |
|---|---|---|---|
| 3,175,068 A * | 3/1965 | Zeitlin et al. ................. | 219/50 |
| 5,195,161 A * | 3/1993 | Adar et al. .................. | 385/129 |
| 5,647,039 A * | 7/1997 | Judkins et al. ................ | 385/37 |
| 6,192,177 B1 * | 2/2001 | Amundson et al. ........... | 385/37 |
| 6,415,066 B1 * | 7/2002 | Harpin et al. ................. | 385/14 |
| 6,721,478 B2 * | 4/2004 | Zhao ........................... | 385/37 |
| 6,847,750 B1 | 1/2005 | Baumann et al. | |
| 6,920,159 B2 * | 7/2005 | Sidorin et al. ................ | 372/20 |
| 2003/0214700 A1 * | 11/2003 | Sidorin et al. .............. | 359/334 |
| 2004/0071386 A1 * | 4/2004 | Nunen et al. ................. | 385/14 |

FOREIGN PATENT DOCUMENTS

WO    WO 01/42848    6/2001

\* cited by examiner

*Primary Examiner*—Ellen E. Kim
(74) *Attorney, Agent, or Firm*—Trop, Pruner & Hu, P.C.

(57) ABSTRACT

A thermo-optical device may use a heater to tune an optical device such as an optical switch, a Mach-Zehnder interferometer, or a variable optical attenuator, to mention a few examples. In some embodiments, polarization-dependent losses caused by the heating and power efficiency may be improved by defining a clad core including an optical core and cladding material on a substrate and covering the clad core on three sides with a heater.

6 Claims, 1 Drawing Sheet

HEATING OPTICAL DEVICES

This is a divisional of prior application Ser. No. 10/351,828, filed Jan. 27, 2003 is now a U.S. Pat. No. 6,961,495.

BACKGROUND

This invention relates generally to optical networks that convey optical signals.

Optical networks may use wavelength division multiplexing so that a plurality of channels, each of a different wavelength, may be multiplexed over the same cable. At a desired termination point for any one of the multiplexed channels, an optical add/drop multiplexer allows light of a given wavelength to be extracted from a plurality of multiplexed light channels. Similarly, a light channel of a given wavelength may be added to the network by an add/drop multiplexer.

One technique for forming an optical add/drop multiplexer is to use the Mach-Zehnder configuration. The Mach-Zehnder interferometer may include two spaced arms, at least one of which may be tuned using a heater. A Mach-Zehnder interferometer may be tuned by changing the refractive index of one of the two arms of the Mach-Zehnder interferometer by heating one arm using an electrical heater.

However, existing heaters have relatively large power consumption when used for purposes of tuning a Mach-Zehnder interferometer. These devices may also exhibit relatively high polarization-dependent losses.

Polarization-dependent losses are losses incurred by various network optical components that are contingent upon the state of polarization of the light interacting with those components. A network component may attenuate light selectively, depending on its state of polarization, changing the intensity of the propagating signal in a random fashion.

Examples of thermal optical devices that exhibit polarization-dependent losses include optical switches, splitters, and variable optical attenuators. A variable optical attenuator is a device that changes the applied attenuation to compensate for example, for the aging of a transmitter or amplifier or to respond to a network's operating conditions. A splitter is a device that splits light into different channels. Optical switches route an optical signal without electro-optical or optoelectrical conversions. Thermal optical devices generally require the application of external power.

Thus, there is a need for better ways to heat thermal optical devices.

DETAILED DESCRIPTION

Figure 1:
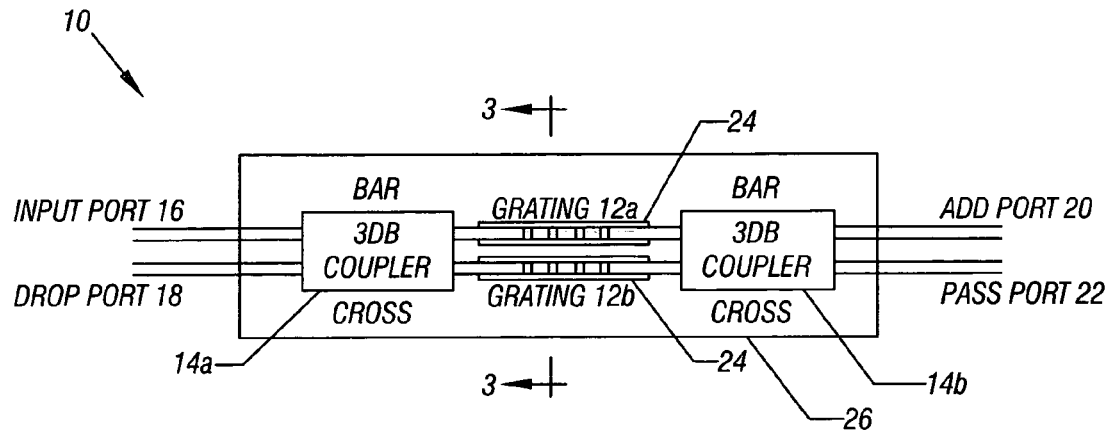
FIG. 1 is a schematic depiction of one embodiment of the present invention.

Referring to FIG. 1, a thermo-optical device 10 may be in the form of a Mach-Zehnder interferometer. Other thermo-optical devices 10 include variable optical attenuators, splitters, and optical switches. While an example follows which considers a Mach-Zehnder thermo-optical device, the present invention is not limited to any particular type of thermo-optical device.

In one embodiment, the interferometer may be implemented as a planar light circuit that is formed using integrated circuit processing techniques in a substrate 26. The various components may be formed as integrated waveguides formed on the substrate 26 in one embodiment.

A pair of Bragg gratings 12a and 12b may be formed on the substrate 26. In one embodiment, the gratings may be formed on a substrate 26 that is a planar waveguide. The thermo-optical device 10 also includes a pair of 3 deciBel (dB) (50-50% coupling) couplers 14a and 14b, The input coupler 14a is coupled to an input port 16 that receives one or more input wavelengths of light. The coupler 14a is also coupled to a port 18. A second coupler 14b is coupled to a port 20 and an express port 22 to output a passed wavelength. Each coupler 14 includes a bar side and a cross bar side as indicated in FIG. 1.

Each grating 12 constitutes one of two arms of the Mach-Zehnder or Michelson interferometer in accordance with some embodiments of the present invention. Input lights that are Bragg matched to the gratings 12 propagate backwardly along the Mach-Zehnder arms and interfere with one another in the first coupler 14a, Once the optical paths of both reflective lights are balanced, all the lights over the wavelength span of interest are phase-matched and all optical energy is transferred into the cross path of the first coupler 14a with little energy returning back to the bar path.

The cross path of the first coupler 14a becomes the drop wavelength port 18 at which signals at the Bragg wavelength of the Bragg gratings 12 get filtered out from other channels. Signals at wavelengths other than the Bragg wavelength transmit through the Bragg gratings 12 and merge in the second coupler 14b.

All transmitted lights of the wavelength span of interest are phase matched using a balanced Mach-Zehnder interferometer. All energy is transferred into the cross path of the second coupler 14b with little leakage to the bar path. As a result, the cross path of the coupler 14b becomes the pass wavelength port 22 through which signals outside the Bragg grating reflection band are transmitted.

The bar path of the second coupler 14b may be used as an add port into which signals that carry the Bragg wavelength are launched. These added signals are reflected by Bragg gratings 12, carried through the cross path of the second coupler 14b and join the pass signals at the pass wavelength port 22 without interfering with each other.

An optical add/drop multiplexer may use the Mach-Zehnder interferometer, which may be tuned by heating both of the gratings 12 using heaters 24 associated with each grating 12 in one embodiment. Such heating may be used to initially tune the Mach-Zehnder interferometer. As a result of heating, the thermo-optical device 10 may be controllably operated. Thus, the heater 24, in one embodiment of the present invention, encloses the upper surfaces of each grating 12.

Figure 2:
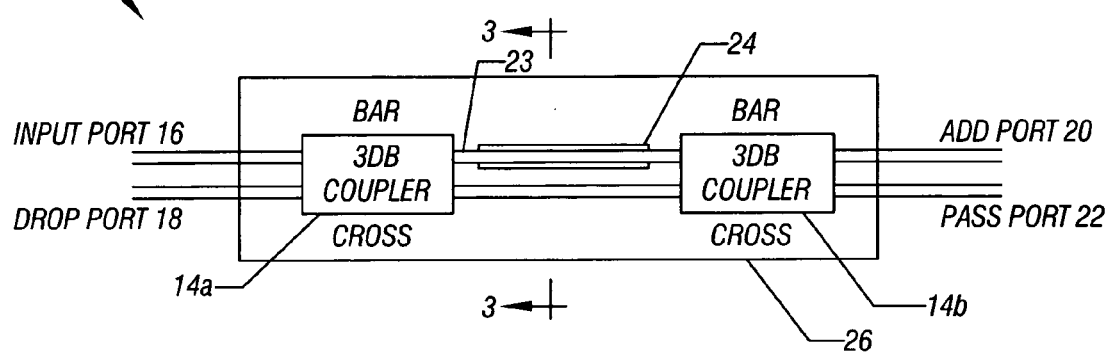
FIG. 2 is a schematic depiction of another embodiment of the present invention.

In connection with a variable optical attenuator 10a, one arm 23 may have a heater 24 in one embodiment of the present invention as shown in FIG. 2.

Figure 3:
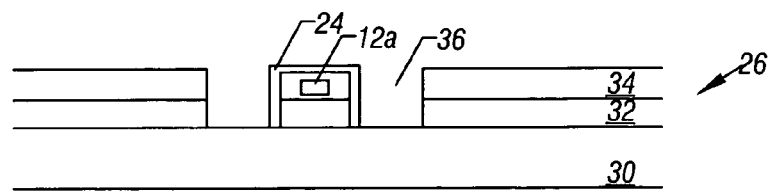
FIG. 3 is an enlarged cross-sectional view taken generally along the line 3—3 in FIGS. 1 or 2.

Referring to FIG. 3, the grating 12a may be defined within a region 38 in the substrate 26. In the embodiment of FIG. 1, a cross-section through the grating 12b would be the same as FIG. 3. The substrate 26 may include a silicon substrate 30, a $SiO_2$ layer 26 over the substrate 30 and a boron phosphate silicon glass layer 34 over the top. A trench 36 is formed through the layers 32 and 34 down to the substrate 30. Formed within the boron phosphate glass layer 34, in the region within the trench 36, is a core 12a which corresponds to the grating 12a and which carries the signal.

A metal resistance heater 24 may be formed over the portions of the layers 34 and 32 within the trench 36. Thus, the grating 12a may be heated from its top and sides. The grating 12a may also be effectively heated from below because the heater 24 also contacts and heats the substrate 30 which underlies the grating 12a.

By enabling the grating 12a to be heated within the trench 36, power consumption may be reduced, in some embodiments, by removing unnecessary cladding material such that heat from the heater flows mainly towards the core 12a, Also, quarter wavelength optical path difference Mach-Zehnder interferometers may be used as well for the same purpose.

Figure 4:
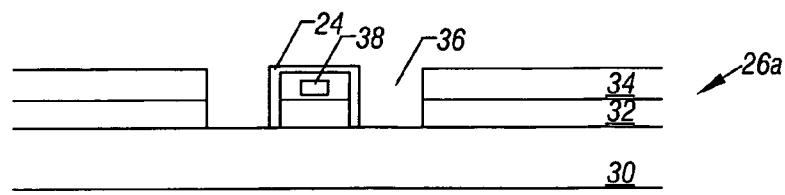
FIG. 4 is an enlarged cross-sectional view taken through another embodiment of the present invention.

Referring to FIG. 4, in accordance with another embodiment of the present invention, the structure may represent a core 38 of an optical switch 26a in accordance with one embodiment of the present invention. In such case no gratings 12 may be used.

In some embodiments, the polarization-dependent losses and power consumption of thermo-optical devices may be reduced. One possible explanation for this effect is that with conventional devices, the grating 12 or core 38 is only heated from above. This may result in a mis-match in thermal expansion coefficients of the heater and that of the cladding material such as boron phosphate silicon glass. This mis-match may generate mechanical stresses at the heater/cladding interface. Since this induced mechanical stress may only appear on one side, namely the top side, the induced refractive index of the core due to the stress optical effect is mainly in the stress direction, causing induced birefringence, which ultimately appears as polarization-dependent losses.

These induced polarization-dependent losses may be reduced by using the surrounding heater configuration. Since the heater 24 surrounds the grating 12a or 12b or core 38 on three sides, the stress induced by the larger thermal expansion coefficients of the heater and silicon substrate may have cubic symmetry since higher thermal expansion materials surround the core on all four sides. Unique stress-axes may not exist and, thus, birefringence may be reduced. As a result, power consumption and phase dependent losses may be reduced in some embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    forming a planar light circuit including a substrate, a thermal insulating layer, and a glass layer formed over said thermal insulating layer;
    forming a trench down to said substrate through said thermal insulating layer and said glass layer and leaving a clad core with a Bragg grating formed therein defined within said trench, said clad core including a core embedded in the glass layer over said thermal insulating layer; and
    forming a heater over said clad core covering the sides and top of said clad core.

2. The method of claim 1 including forming the clad core with a top surface and a pair of opposed side surfaces and defining said heater on said top and side surfaces.

3. The method of claim 2 including forming said heater down to contact the substrate.

4. The method of claim 1 including forming a Mach-Zehnder interferometer.

5. The method of claim 1 including forming a tuned Mach-Zehnder interferometer.

6. The method of claim 1 including reducing polarization-dependent losses by heating the core from at least three sides.

* * * * *